Inventors
ARTHUR D. MARGISON
ADAM CRAIGON
By: Fetherstonhaugh & Co.
Att'ys

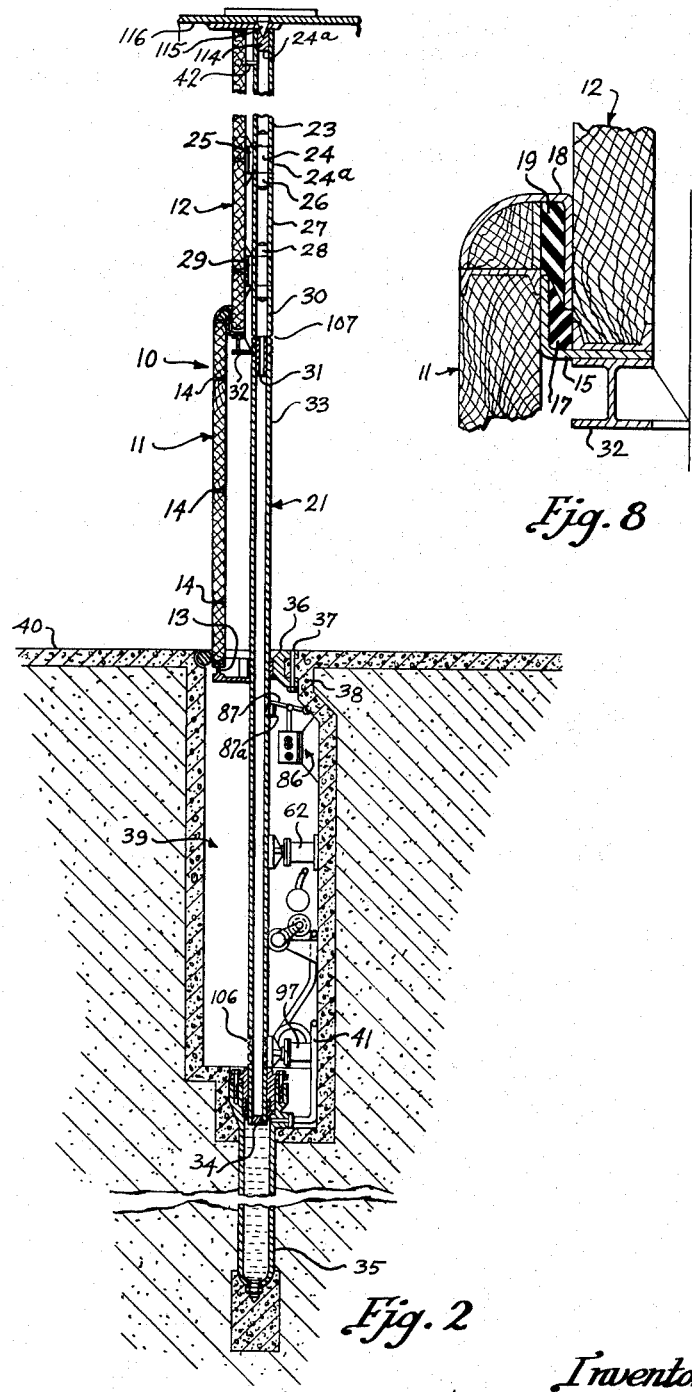

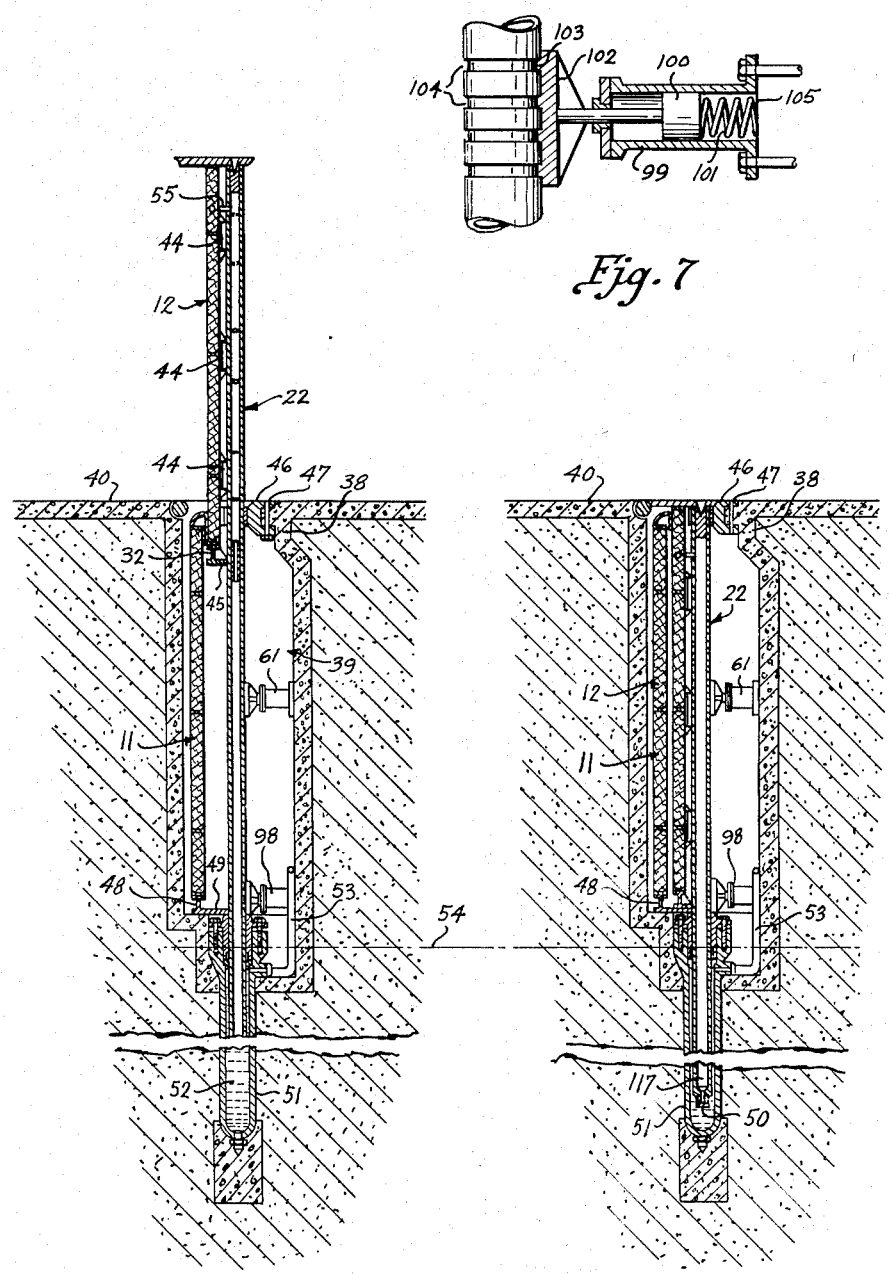

Oct. 21, 1952     A. D. MARGISON ET AL     2,614,835
MECHANISM FOR RAISING AIRCRAFT HANGAR DOORS

Filed May 6, 1949     6 Sheets-Sheet 4

Inventors
ARTHUR D. MARGISON
ADAM CRAIGON
By: Fetherstonhaugh & Co.
Att'ys

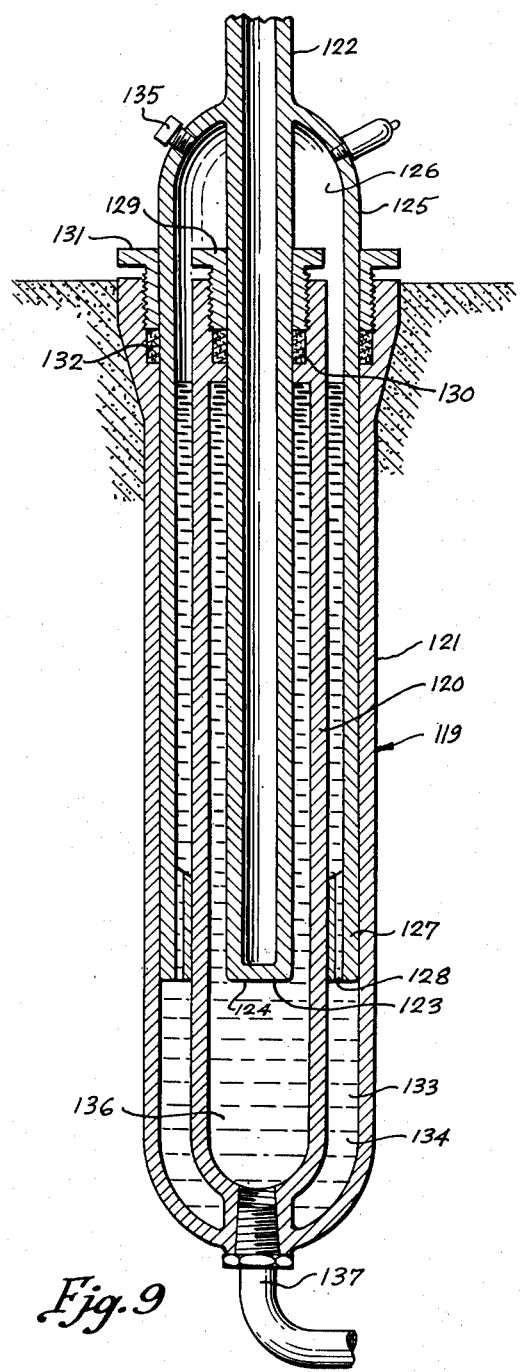

Patented Oct. 21, 1952

2,614,835

UNITED STATES PATENT OFFICE 2,614,835

MECHANISM FOR RAISING AIRCRAFT HANGAR DOORS

Arthur Donald Margison and Adam Craigon, Toronto, Ontario, Canada, assignors to Margison & Babcock, Toronto, Ontario, Canada Application May 6, 1949, Serial No. 91,734

7 Claims. (Cl. 268—58)

1

This invention relates to improvements in aircraft hangars and specifically the mounting and arrangement of aircraft hangar doors.

In conventional aircraft hangar construction the doors are moved either from side compartments laterally for closure or from the region of the roof structure downwardly for closure. In the first mentioned type of arrangement, the area of the door openings is limited by the required storage space or receiving compartments for the doors in the open position. In some cases this has been modified by allowing the doors to slide in parallel relation over one another. However, maximum freedom still is not accomplished. In respect to the suspended type of door this allows more freedom in the door opening and is particularly advantageous from this aspect. However, a serious difficulty arises in providing a roof or truss structure which is sufficiently heavy to carry the suspended type of door particularly in the larger type of aircraft hangar. Therefore, it will be appreciated that in prior aircraft hangar door arrangements the weight of the door not only leads to high cost of installation both in the laterally moving type and the suspended type, but also requires heavy structural features which are obviated if the arrangement according to the invention is adopted.

This invention has for its main object the provision of an aircraft hangar wherein a receiving compartment is provided for a hangar door which extends below the floor level of the hangar and wherein the door is supported from the ground rather than from the hangar structure.

Another object of the invention is to provide an improvement in a hangar door arrangement for aircraft hangars wherein a hangar door is foldable into a pit extending below the floor level and is supported and actuable by means within the pit for raising the door and wherein these actuating means form the sole means of support for the door.

A further object of the invention is to provide a door of the type referred to herein for an aircraft hangar and means for actuating same of the fluid-pneumatic type wherein the dead weight of the door is substantially counter-balanced by initial compressible fluid pressure when the door is in the full open position and whereby further fluid pressure is employed for raising the door.

A still further object of the invention is to provide means for actuating a door of the class described as before in which the door is supported within a pit by a plurality of tubular piston elements, certain of which are actuated by air pressure and at least one other of which is actuated by a hydraulic ram, the air pressure preferably being only sufficient to overcome the dead weight of the door and its accessories.

2

With these and other objects in view the invention relates to improvements in an aircraft hangar with respect to a receiver compartment for a hangar door and comprising a pit extending below the floor level of the hangar and designed to receive the full depth of a door when the latter is in the full open position. Means are also provided within the pit so that the side and top edges of the door are unobstructed and which constitute the sole means of support for the door except as may be required in the form of locating pins engaging the upper edge of the door when the latter is in the full closed position.

Other objects of the invention will be appreciated by a study of the following specification taken in conjunction with the accompanying drawings.

In the drawings, wherein one door and the mounting of the door is required to be illustrated to skilled persons:

Figure 2 is sectional view 2—2 of Figure 1.

Figure 3 is a sectional view 3—3 of Figure 1.

Figure 4 is another operative view of Figure 3 showing the door in the lowered position.

Figure 7 is a sectional view of a locking shoe employed in locking the door in the closed or in the open position.

Figure 8 is an enlarged part of a sectional view of the interlocking mechanism on the doors.

Figure 9 is a sectional view of the hydroleopneumatic device of simplified form according to the invention.

In specific reference to the drawings, it will be appreciated that the structural arrangement disclosed is merely one suitable design of door mechanism according to the invention, the inherent characteristic of which involves the placement of the door in a pit below floor level of an aircraft hangar. The door is mounted in such manner that the side and upper edges are free when the door is opening and closing, the actuating mechanism therefore being in the pit.

Figure 1:
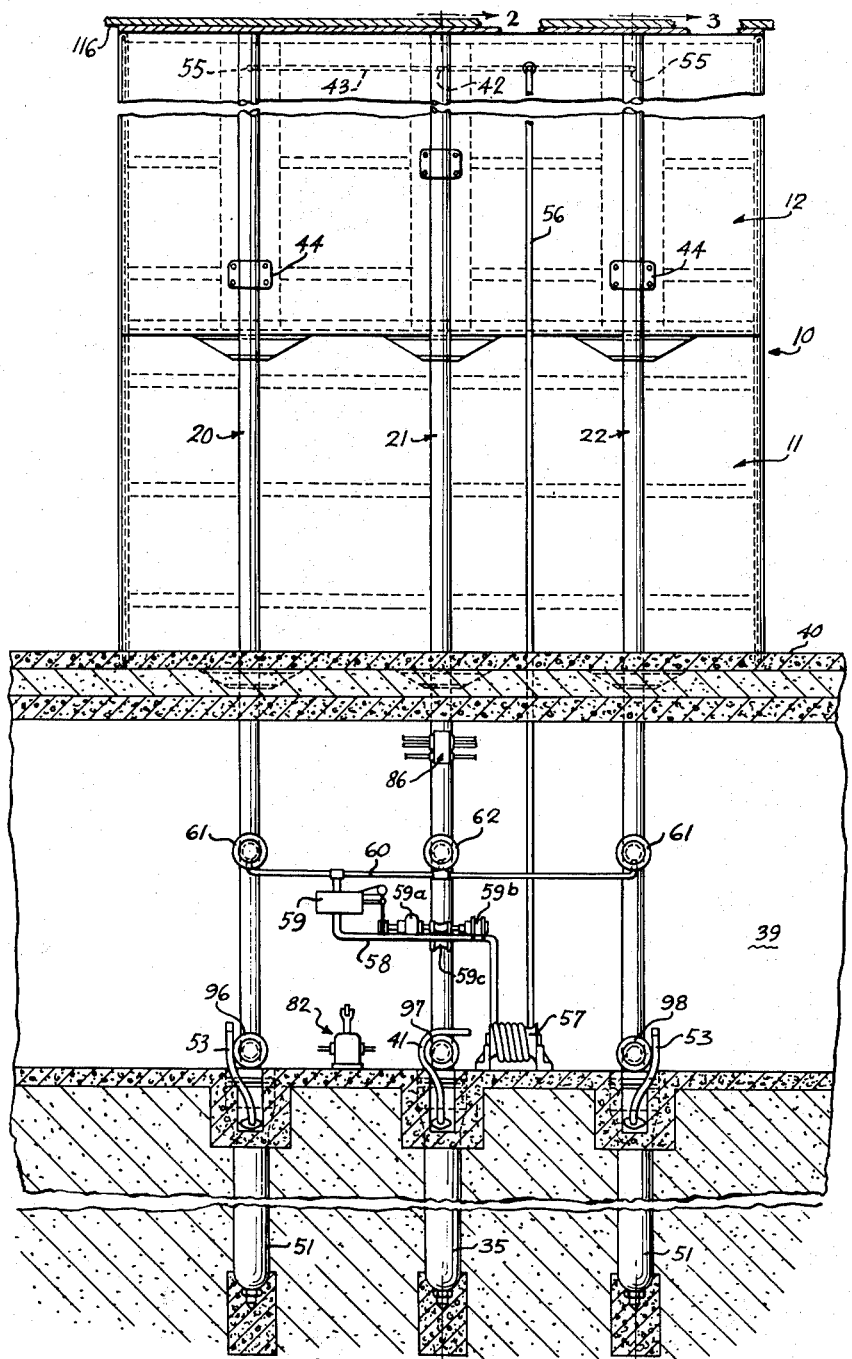
Figure 1 is an elevation of the rear or inner face of a hangar door of the invention, illustrating the manner of mounting the same in a pit extending below floor level and indicating the actuating mechanism therefor.

Thus referring to Figure 1, the door 10 although being illustrated as comprised of the folding panels 11 and 12 may be in one unit if desired. In the particular illustration each of the doors is comprised of a frame preferably formed of channel members 13 constituting the perimeter having transverse I-shaped pieces 14 extending therebetween and covered by suitable sheet metal or the like. The uppermost door panel 12 has at its lower edge a steel flange 15 running transversely and which carries a weather stripping 17 which is engageable by a flange and weatherstripping arrangement 18 and 19 of the lower panel 11. The upper panel 12 is mounted preferably on a plurality of tubes such as the tubes 20, 21 and 22. As noted in Figure 2 the tube 21 is fastened to the tubular portion 24ª of bracket mounting 25 by a hollow thread screw 26. This screw passes below the bracket 25 to thread into the upper end of the tubular component 27 which in turn fastens in a similar manner by means of screw 28 to bracket 29 which engages the upper end of the component 30. The other end of component 30 is fastened in a similar manner by the hollow screw 31 to the supporting flange 32 from which the component 33 extends downwardly to terminate in a plug 34 within the ram cylinder 35. The tube 21 passes through the bearing sleeve 36 which extends from anchorage as at 37 to the wall 38 of the pit 39 which extends below the floor surface 40 of the aircraft hangar. The construction of the oleo-pneumatic cylinder 35 is well known to skilled persons in regard to details of the packing glands and the like required for sealing it being only necessary to indicate that an input and output line 41 extends therefrom to pressure control mechanisms yet to be described. It will be noted that fluid pressure may travel upwardly through the tubes 20 and 22 to the upper plug 24. At the upper terminus of the passage, however, an air line 42 is in communication therewith which is in communication with the upper tubes 20 and 22 by the common air line 43.

The tubes 20 and 22 are similarly constructed and arranged as indicated in Figures 3 and 4. The tube 22 illustrated is made of a plurality of sections or components similar to the manner of assembly of the tube 21 and fastens to panel 12 by suitable brackets 44 and supporting flange 32 which carries an extending portion 45 which is necked for passage through a vertical slot in the bearing 46 which is fastened as at 47 to the wall 38. The lower edge of the panel 11 is supported by the flange 48 which has an extending portion 49 slidably fastened to the tube 22 in a similar manner to the connection at 13 in Figure 1 which also is necked for passage through its associated bearing 36. In this case the lower end of each of the tubes 20 and 22 carries a poppet valve 50 which may be released by excessive pressures in the oleo-pneumatic cylinder 51 to allow fluid 52 to pass upwardly into the tube. Preferably the end region of the tube carries a plurality of small orifices (not shown) which allow the predetermined rate of descent of the tubes even though no braking system were to be employed. Preferably the fluid 52 which may be a suitable oil is poured into the cylinder 51 through an entry tube 53 to a desired level 54 the fluid being employed for a cushioning effect when the doors are being lowered. Again at the upper extremity of the tubes 20 and 22 communication is provided by fittings 55 with the common airline 43 which communicates by a flexible hose 56 (Figure 1) to a suitable reel device 57 and thence by line 58 to a piston valve 59 controlling air pressure in the common line 60 controlling air brakes 61 and 62.

It should be noted that the hydraulic ram cylinder 35 is merely required to supply sufficient power to lift the door within a required period of time wherein the power consumed is suitably reduced by the initial air pressure in the oleopneumatic cylinders or tubes 20 and 22. Thus, according to the invention the initial air pressure in the oleo-pneumatic tubes 20 and 22 is sufficient to support the weight of the door and its accessories when the door is in the lowermost or open position. As the ram cylinder 35 acts to raise the door the air pressure gradually reduces.

Figure 5:
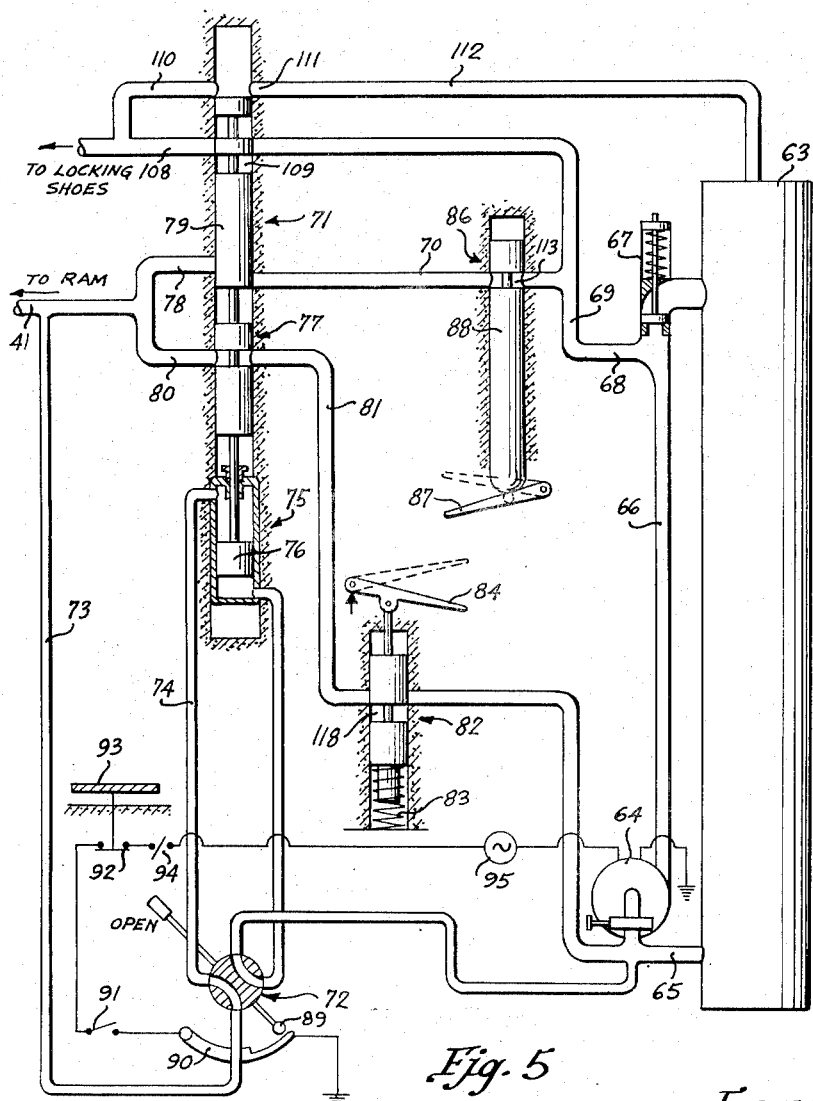
Figure 5 is a diagrammatic view of the electro-hydraulic circuit incident to the actuation of the hydraulic cylinder and piston arrangement of Figure 2 utilized in the raising of the door and illustrating the position of the hydraulic components for the open position of the door.
Figure 6:
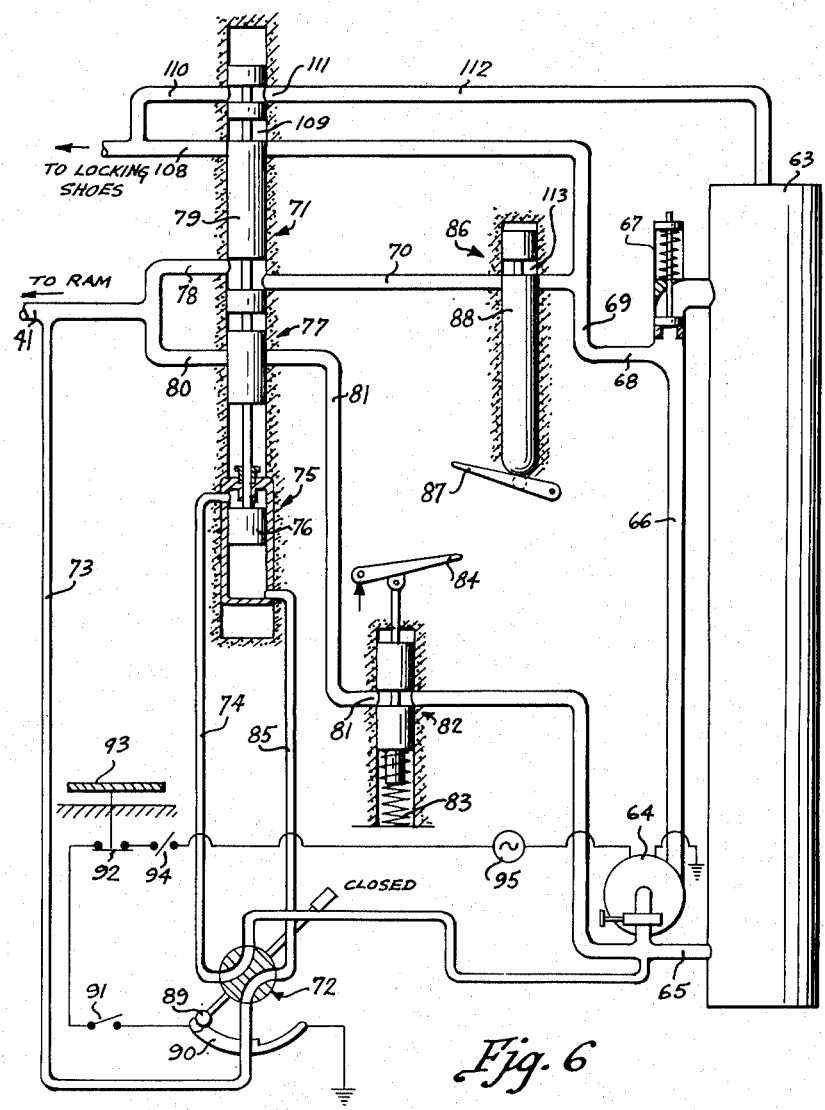
Figure 6 is a view corresponding to Figure 5 with a further operative position of the components corresponding to the closed or raised position of the door.

The hydraulic circuit incident to the operation of the ram cylinder 35 is disclosed in Figures 5 and 6. Suitable hydraulic fluid is stored in tank 63 from which fluid is drawn by electric pump 64 by line 65. The output of the pump 64 is delivered to line 66 which connects with a suitable pressure relief valve device 67 through which fluid may pass back to the tank 63 when a predetermined pressure is exceeded. Line 68 communicates by lines 69 and 70 to servo-cylinder 71 which is controlled in its operation by a manually operable control lever and valve 72. Line 41 is shown which on referring to Figure 2 serves the ram cylinder 35. Pressure is taken from this line by line 73 to the valve 72 shown in the open position in Figure 5 corresponding to the line 74 to control valve 75 causing the piston 76 thereof to draw the multiple valve components 77 downwardly to the position indicated in this figure. As a consequence the line 78 extending from line 41, Figure 2, for communication with line 70 is interrupted by element 79 and line 80, but line 80 is placed in communication with line 81 which extends through the limit valve arrangement 82 for connection to line 69. In this case, however, the valve 82 is depressed against pressure of spring 83 by the door engaging its actuating arm 84 which is placed in the path of the door at the bottom of the pit 39 (see Figure 1). Referring also to Figure 6 as the actuating lever is swung to change the position of the valve components indicated by numeral 72 to that illustrated in the latter figure, pressures will be reversed as between the lines 74 and 85 and piston 76 will be urged in the upward position illustrated. Under these circumstances, there will be a communication between lines 69 and 41 by way of lines 78 and 70 since the upper limit valve device 86 will not obstruct the flow in the line 70 until the door has reached its uppermost position. Thus, pressures may find through circuit to actuate the ram piston 21 and cause the door to be raised until arm 87 is actuated by lug 87a on tube 21 (see Figure 2) causing the same to move the piston elements 88 upwardly for closure of line 70. In lowering the door circuit will be provided through lines 80 and 81 as previously described with reference to Figure 5 and line 81 will be in communication with line 65 until valve 82 is actuated by engagement with the bottom of the door in the full open position.

It should be noted that the control lever valve 72 incorporates an electric contact slider 89 which engages the contact segment 90 in a predetermined arc corresponding to a range of positions between an intermediate position of the control lever and the closed position thereof shown in Figure 6. The contact segment 90 connects to a main control switch 91 which is series connected to a normally closed depressible switch device 92 operative by the safety tread plate 93 in conventional manner. Electric switch 94 is electrically in series with switch 92 and is arranged to serve as a limit switch engageably by means extending from the door when the latter reaches its uppermost position for closing of the door opening. Switch 94 connects to a source of electric current 95 which serves the electric pump 64.

It will, therefore, be apparent that when the control lever valve 72 is swung for closing of the door the electric contact slider 89 completes the electric circuit of the electric pump 64 if the main switch 91 is closed. Pressure is therefor built up in the hydraulic ram described and the main piston control valve 71 is urged to the upward position illustrated in Figure 6. At this point of operation the door cannot be raised until the locking shoes 96, 97 and 98 (Figures 1 to 4) are released. Referring to Figure 7 a typical type of locking shoe which may be employed is illustrated being comprised of a cylinder 99 including a piston member 100 normally under pressure of compression spring 101 forcing the shoe 102 with its locking lugs 103 against and into engagement with suitable recesses 104 in one of the tubes such as tubes 20, 21 and 22. The base 105 of the cylinder 99 is anchored to the side wall of the pit 39 in a suitable manner, the locking shoes being located near the bottom of the pit to engage serrations in the tubes located in predetermined manner near the lower extent of the tubes to determine the maximum fixed height to which the door is raised. Thus, in Figure 2, the tube 21 may have serrations as at 106 for this purpose and also at 107, the latter determining the lower locked position of the door assembly.

Therefore, as the control lever valve is moved to the closed position the locking shoes 96, 97 and 98 will be placed in communication with fluid pressure as the piston control valve 71 moves from the position illustrated in Figure 5 to the position illustrated in Figure 6. Thus, the line 108 connecting to these locking shoes conducts pressure fluid as the cutaway portion 109 of the piston moves transversely of the line. There is a momentary impulse of pressure, therefore, which causes the locking shoes to withdraw from engagement with the serrations on the tubes. At the same time, partial communication is provided during passage of the main piston control valve to its new position through the lines 70 and 78 to the ram cylinder thereby causing the door to be raised. As the main piston control valve arrives at the position shown in Figure 6 pressures in the locking shoes will be released by communication provided through the return flow line 110 which will then be in communication through the valve opening 111 with the line 112 returning to the tank 63. Therefore, the locking shoes will again engage the surfaces of the various tubes but the tubes will slide thereover as they progress upward. During the upward movement of the door and the tubes the air pressure in the oleo-pneumatic tubes 20 and 22 will be progressively reduced having been in the first instance sufficient to support substantially the weight of the door and its accessories.

As the door approaches its closed position the limit arm 87 will be actuated and the line 70 gradually severed in its communication with the line 69. In this connection, shaping of the valve aperture 113 is preferred in order to provide a slow final closing. It should also be noted that the upper plugged end of the tubes as indicated by 24ª in Figure 2 may include a socket 114 designed to be engaged by a depending conical or wedge-shaped finger 115 extending downwardly from the upper edge of the door frame 116 wherein the latter is a part of the hangar structure proper. To some extent this will avoid difficulties which may be encountered by deflections during windy weather conditions.

As the door reaches the final closed position the limit switch 94 (Figures 5 and 6) will be actuated to open the circuit for the electric pump 64. The locking shoes described will also automatically engage under their spring pressure with the serrations on the tubes to lock the door in the closed position.

In opening the door the control lever valve 72 is moved to the position illustrated in Figure 5, causing the piston control valve 71 to move downwardly. During this downward movement the cutaway portion 109 allows momentary communication in the line 108 causing the locking shoes to disengage from the tube. It will be noted that the electrical circuit for the electric pump 64 will not come into operation during the opening operation of the doors and that as the piston control valve 71 reaches the position illustrated in Figure 5 a through path is provided for release of pressure from the ram through the line 81 since the valve arrangement 82 will be open until the door approaches its finally closed position. The release of the locking shoes in this case also will only be momentary and it will be observed that in the position of the control valve 71 illustrated in Figure 5 the line 110 will finally arrive at a position where communication is provided between the lines 110 and 112 whereby pressures are released from the locking shoes and they slidably engage the downwardly moving tubes under spring pressure. Fluid pressure from the ram cylinder will continue to flow through line 81 back to the tank 63 by line 65 and during the lowering action of the door will be accompanied by an increase of air pressure in the oleo-pneumatic tubes or legs 20 and 22.

It is, of course, desirable that some means be provided for limiting the rate of descent of the door structure and in this connection a plurality of small leakage orifices in the region indicated by numeral 117 (Figure 4) are provided in the oleo-pneumatic tubes 20 and 22. Therefore, the fluid in these cylinders will flow gradually into the tubes as the tubes descend. If desired, suitable brake shoe cylinders 61 and 62 may be provided and which are actuated by air pressure as previously described from the common line 60 which is in communication with the tubes 20 and 22. The air brakes are normally released under spring pressure but are adjustable by a centrifugal type governor 59ª operatively related to a Selsyn indicator 59ᵇ driven by a roller 59ᶜ running on the tube 21. Thus, if the rate of descent of the door becomes excessive the air brakes will act to compensate for the increased rate of descent by engaging the tubes with increasing friction. It may be noted here that the use of air brakes as described is not essential where leakage orifices are provided such as in the region 117 of the oleo-pneumatic pistons or tubes 20 and 22.

In the final moment of the door opening the arm 84 of the limit valve 82 will be actuated by mechanism associated with the lower edge of the door, that is to say, of panel 12 so that the final resting of the door will be cushioned by the interruption of communication of fluid from the hydraulic ram to the tank 63. In this connection it is preferred that the valve opening 118 be shaped appropriately so that the door eases into its final position of rest where the locking shoes engage in the serrations of the tube such as serrations in the region 107 of tube 21 of Figure 2 under impulse of their spring pressure.

Although one practical device according to the invention has been described in particular detail herein, it will be appreciated that the combination of a hydraulic device and oleo-pneumatic devices for actuating the door structure is only a preferred embodiment since obviously the doors may be actuated by other mechanism well known such as worm screw devices associated with the tubes, and the like. Certain alternatives will be apparent to skilled persons in the combined hydraulic and oleo-pneumatic combination described herein. In reference to such combination it is desired to define it as a "hydroleo-pneumatic" device, the inherent characteristics of which involve the provision of a hydraulic ram as the main lifting device and which employs a fluid of the generally recognized non-compressible class such as lubricating fluids and the like. In conjunction with such hydraulic lifting device a pneumatic device is provided in parallel relation therewith. That is to say, a pneumatic device employs a fluid of a type generally recognized as belonging to the compressible class such as air and this pneumatic device carries the compressible fluid at an initial pressure designed to substantially overcome the static load of the structure to be lifted by the hydraulic device. In doing so, both the hydraulic device and the pneumatice device must have independent reaction points and act as independent structures in parallel relation. A further feature which may be embodied in the pneumatic device is the incorporation of a non-compressible fluid to provide a cushioning effect such as is present in the oleo-pneumatic devices incident to the tubes 20 and 22 previously described. It should be clearly noted that in the lifting of heavy structures the horse power consumed is of the utmost importance. Conventional methods of counter-balancing would involve excessively heavy structures and would necessarily in practically all instances involve engagement of the structure at more than one edge thereof unless, of course, the structure were to be lifted by a heavy lifting structure. It has been found that a horsepower saving of about fifty percent may be effected in a practical installation of a device according to the invention and this is accomplished without prohibitive expense normally associated with counter-balancing practice.

It is intended that the present disclosure should not be construed in any limiting sense other than that indicated by the scope of the following claims.

The embodiments of the invention in which an exclusive property or privilege is claimed are defined as follows.

We claim:

1. An upwardly movable closure mechanism for a large opening, comprising in combination: a door having three free edges and a bottom edge, a supporting member fastened to said door and projecting downwardly therefrom past the lower edge, a hydraulic ram connecting to said member for raising the latter to cause said door to close an opening, an air pressure chamber including piston means operatively connected to said door, means for creating an air pressure in said chamber sufficient to support said door in a position short of the closed position thereof, said door supporting member projecting below said door a distance greater than the depth of the door, guide means for said member defining the lower terminus of the door opening and spaced from said hydraulic ram a sufficient distance to accommodate the door when it is moved to a position whereat the upper free edge thereof is adjacent said guide means to provide a cantilever support for said door when it is moving for closure of said opening.

2. An upwardly movable closure mechanism for a large opening, comprising in combination: a door having three free edges and a bottom edge, a supporting member fastened to said door and projecting downwardly therefrom past the lower edge, a hydraulic ram connecting to said member for raising the latter to cause said door to close an opening, an air pressure chamber including piston means operatively connected to said door, means for creating an air pressure in said chamber sufficient to support said door in a position short of the closed position thereof, said door supporting member projecting below said door a distance greater than the depth of the door, guide means for said member defining the lower terminus of the door opening and spaced from said hydraulic ram a sufficient distance to accommodate the door when it is moved to a position whereat the upper free edge thereof is adjacent said guide means to provide a cantilever support from said door when it is moving for closure of said opening, said door comprising a plurality of overlying panels, said door supporting member being fastened to one of said panels only, interlocking means on the bottom and top edges of adjacent panels to cause consecutive raising of said series of panels when the panel attached to said door supporting member is moved to close the door opening.

3. An upwardly movable closure mechanism for a large opening, comprising in combination: a door having three free edges and a bottom edge, a supporting member fastened to said door and projecting downwardly therefrom past the lower edge, a hydraulic ram connecting to said member for raising the latter to cause said door to close an opening, an air pressure chamber including piston means operatively connected to said door, means for creating an air pressure in said chamber sufficient to support said door in a position short of the closed position thereof, said door comprising a plurality of overlying panels, said door supporting member being fastened to one of said panels only, interlocking means on the bottom and top edges of adjacent panels to cause consecutive raising of said series of panels when the panel attached to said door supporting member is moved to close the door opening.

4. An upwardly closing door mechanism for a large opening having upper and lower edges wherein the upper edge of the door is substantially flush with the lower edge of the opening when the door is in the lowered position, and the upper edge of the door engages the upper edge of the opening when the door is in the raised position, and comprising in combination: a door, a support member fastened to the door between its side edges and projecting downwardly from said door past the lower edge of the door opening, a hydraulic ram for actuating said support member and spaced from the lower edge of the opening a distance sufficient to accommodate the full depth of the door therewithin when the latter is in the lowered position, a pair of counter-balancing support members each located adjacent a side edge of the door and fastened thereto and projecting therebelow a distance corresponding to the downward projection of said first mentioned support member, pneumatic rams at the lower ends of said counter-balancing support members each having a pressure chamber, means interconnecting the pressure chambers of said rams whereby the pressures therein may counterbalance the weight of the door and members attached thereto when the door is in the lowered position.

5. An upwardly closing door mechanism for a large opening having upper and lower edges wherein the upper edge of the door is substantially flush with the lower edge of the opening when the door is in the lowered position, and the upper edge of the door engages the upper edge of the opening when the door is in the raised position, and comprising in combination: a door, a support member fastened to the door between its side edges and projecting downwardly from said door past the lower edge of the door opening, a hydraulic ram for actuating said support member and spaced from the lower edge of the opening a distance sufficient to accommodate the full depth of the door therewithin when the latter is in the lowered position, a pair of counter-balancing support members each located adjacent a side edge of the door and fastened thereto and projecting therebelow a distance corresponding to the downward projection of said first mentioned support member, pneumatic rams at the lower ends of said counter-balancing support members each having a pressure chamber, means interconnecting the pressure chambers of said rams whereby the pressures therein may counterbalance the weight of the door and members attached thereto when the door is in the lowered position, and guide means for said door supporting member and said door counter-balancing members located outside the door opening but adjacent the lower edge thereof to support said door against wind forces when it is moving between lowered and raised positions.

6. An upwardly closing door mechanism for a large opening having upper and lower edges wherein the upper edge of the door is substantially flush with the lower edge of the opening when the door is in the lowered position, and the upper edge of the door engages the upper edge of the opening when the door is in the raised position, and comprising in combination: a door, a support member fastened to the door between its side edges and projecting downwardly from said door past the lower edge of the door opening, a hydraulic ram for actuating said support member and spaced from the lower edge of the opening a distance sufficient to accommodate the full depth of the door therewithin when the latter is in the lowered position, a pair of counter-balancing support members each located adjacent a side edge of the door and fastened thereto and projecting therebelow a distance corresponding to the downward projection of said first mentioned support member, pneumatic rams at the lower ends of said counter-balancing support members each having a pressure chamber, means interconnecting the pressure chambers of said rams whereby the pressures therein may counterbalance the weight of the door and members attached thereto when the door is in the lowered position, said door being in the form of a plurality of overlapping panels, one of which only is fastened to said door supporting member and said door counter-balancing members, means on the upper and lower edges of each panel for interconnecting adjacent panels as said door is moved to the raised position, and means for supporting said panels in substantially telescoped relationship when the door is in the lowered position.

7. An upwardly closing door mechanism for a large opening having upper and lower edges wherein the upper edge of the door is substantially flush with the lower edge of the opening when the door is in the lowered position, and the upper edge of the door engages the upper edge of the opening when the door is in the raised position, and comprising in combination: a door, a support member fastened to the door between its side edges and projecting downwardly from said door past the lower edge of the door opening, a hydraulic ram for actuating said support member and spaced from the lower edge of the opening a distance sufficient to accommodate the full depth of the door therewithin when the latter is in the lowered position, a pair of counter-balancing support members each located adjacent a side edge of the door and fastened thereto and projecting therebelow a distance corresponding to the downward projection of said first mentioned support member, pneumatic rams at the lower ends of said counter-balancing support members each having a pressure chamber, means interconnecting the pressure chambers of said rams whereby the pressures therein may counterbalance the weight of the door and members attached thereto when the door is in the lowered position, guide means for said door supporting member and said door counter-balancing members located outside the door opening but adjacent the lower edge thereof to support said door against wind forces when it is moving between lowered and raised positions, said door being in the form of a plurality of overlapping panels, one of which only is fastened to said door supporting member and said door counter-balancing members, means on the upper and lower edges of each panel for interconnecting adjacent panels as said door is moved to the raised position, and means for supporting said panels in substantially telescoped relationship when the door is in the lowered position.

ARTHUR DONALD MARGISON.
ADAM CRAIGON.

REFERENCES CITED

The following references are of record in the file of this patent:

UNITED STATES PATENTS

| Number | Name | Date |
| --- | --- | --- |
| 621,669 | Hinds | Mar. 21, 1899 |
| 1,250,992 | Dost | Dec. 25, 1917 |
| 1,530,056 | Pace | Mar. 17, 1925 |
| 2,193,350 | Silver | Mar. 12, 1940 |
| 2,330,005 | Odenthal | Sept. 21, 1943 |
| 2,440,561 | Wilder | Apr. 27, 1948 |

FOREIGN PATENTS

| Number | Country | Date |
| --- | --- | --- |
| 483,163 | Germany | Dec. 1, 1927 |